US008336432B1

(12) United States Patent
Butler (10) Patent No.: US 8,336,432 B1
(45) Date of Patent: Dec. 25, 2012

(54) SAFETY SYSTEM FOR MACHINE TOOLS (76) Inventor: David J Butler, Cotuit, MA (US)

( * ) Notice: Subject to any disclaimer, the term of this patent is extended or adjusted under 35 U.S.C. 154(b) by 0 days.

(21) Appl. No.: 13/244,376

(22) Filed: Sep. 24, 2011

Related U.S. Application Data (60) Provisional application No. 61/525,613, filed on Aug. 19, 2011.

(51) Int. Cl.
  *B26D 5/00* (2006.01)
  *B26D 1/14* (2006.01)
  *B27B 5/08* (2006.01)

(52) U.S. Cl. ......... 83/58; 83/62.1; 83/DIG. 1; 83/471.3; 83/477.1; 83/490; 83/589; 83/581

(58) Field of Classification Search ............. 83/58, 62.1, 83/DIG. 1, 471.3, 477.1, 490, 589, 581, 486, 83/485, 491, 522.12, 781, 74, 788, 477.2, 83/13, 471, 397.1, 478, 168; 340/590, 686.5; 241/37.5
See application file for complete search history.

(56) References Cited

U.S. PATENT DOCUMENTS

| | | | | |
|---|---|---|---|---|
| 2,704,339 | A | | 3/1955 | Wescott et al. ............... 317/146 |
| 2,992,420 | A | | 7/1961 | Riker ........................... 340/276 |
| 3,025,434 | A | | 3/1962 | Atkins et al. .................. 317/146 |
| 3,111,608 | A | | 11/1963 | Boenning et al. ............. 317/146 |
| 3,200,305 | A | | 8/1965 | Atkins et al. .................. 317/146 |
| 3,785,230 | A | * | 1/1974 | Lokey ............................. 30/388 |
| 4,033,218 | A | * | 7/1977 | Donatelle ....................... 83/478 |
| 4,622,437 | A | | 11/1986 | Bloom et al. ................. 340/712 |
| 5,081,406 | A | * | 1/1992 | Hughes et al. ................ 318/478 |
| 5,198,702 | A | * | 3/1993 | McCullough et al. ........ 307/326 |
| 5,510,685 | A | * | 4/1996 | Grasselli ....................... 318/434 |
| 6,813,983 | B2 | * | 11/2004 | Gass et al. ...................... 83/62.1 |
| 6,853,300 | B2 | | 2/2005 | Kuan ............................. 340/565 |
| 2004/0194594 | A1 | * | 10/2004 | Dils et al. ......................... 83/13 |

FOREIGN PATENT DOCUMENTS

DE 19609771 A 6/1998

OTHER PUBLICATIONS

Artisan Controls Corp., *Model 4310 Interval Timer*, retrieved Sep. 19, 2011 from www.artisancontrols.com/products/4310.htm ; pp. 1-2.
David A. Johnson, *Model QTFS3X Externally Powered*, updated Apr. 24, 2011, retrieved Sep. 18, 2011 from www.djandassoc.com / Faraday/faraday-qt.html; pp. 1-3.
Philips Semiconductor, *PN2907 PNP Switching Transistor* datasheet May 5, 1997, pp. 1-9.
Ashwini Singh, *Induction Motor Braking*, © 2011 SCRIBD.COM, downloaded Sep. 20, 2011 from www.scribd.com/doc/3858594/Induction-Motor-Braking#archive, pp. 1-18.
Atmel Corp., *Guide to IEC60730 Class B Compliance*, Apr. 2008, pp. 1-9.
Mitsubishi Electric, *FR-D700 Global Standard*, Dec. 2010, pp. 1-34.
Kebco Power Transmission, *Spring-Set Brakes*, Jun. 2001, pp. 1-24.

* cited by examiner

*Primary Examiner* — Ghassem Alie
(74) *Attorney, Agent, or Firm* — Milton Oliver, Esq.; Oliver Intellectual Property LLC (57) ABSTRACT

A safety system for a rotary saw or other dangerous machine tools features a flesh-sensing circuit (14, 19), located on a safety guard (16) surrounding a dangerous machine part, which generates an electronic signal to trigger emergency stopping of the machine before the operator can contact the dangerous machine part. The stopping means preferably employs DC injection, winding current direction reversal and/or electromagnetic motor braking, in the event of detection of operator contact with the safety guarding device. The system is adapted to be used both with newly-manufactured machine tools and by retrofitting onto previously-manufactured machine tools, by in-the-field modifications.

18 Claims, 12 Drawing Sheets

SAFETY SYSTEM FOR MACHINE TOOLS

CROSS-REFERENCE TO RELATED APPLICATION

This application claims priority from my provisional application Ser. No. 61/525,613, filed 19 Aug. 2011.

FIELD OF THE INVENTION

The present invention is in the technical field of safety systems for machine tools. More particularly, the invention is in the field of sensing a dangerous condition, and protecting a machine tool operator from accidentally contacting a dangerous portion of a machine tool, by rapidly disabling or stopping the machine whenever a dangerous condition is detected.

BACKGROUND OF THE INVENTION

There exists an urgent need for improved safety features for machine tools, especially for machine tools such as table saws, which overall have an especially grim safety record, dating back more than a century. Each day, consumer-grade table saws cause life-changing trauma injuries in the United States and other nations, including an estimated ten amputations daily in the United States alone. Besides table saws, many machine tools, such as woodworking and metalworking machines including, but not limited to: band saws, drill presses, lathes, shapers, jointers, jig saws, disk sanders and spindle shapers, milling machines and grinders, require the operator to manually move a work piece and/or the operator's hands in close proximity to a cutting blade or to other potentially dangerous elements or features. It is not uncommon for machine operators to inadvertently contact the dangerous element, resulting in a very serious injury such as amputation of fingers or mutilation of hands, resulting in a life-altering disability and much pain and suffering as well, as great financial costs for medical treatment, rehabilitation and lost income. The estimated annual cost of such accidental table saw accidents, in the United States alone, has been estimated to be $2 billion, which places an economic burden on not only the injured persons, but also on employers, manufacturers, retailers, medical institutions, insurance companies and government.

In the US, consumer table saws alone presently account not only for ten accidental amputations daily, but for an aggregate of 35,000 visits annually to hospital emergency rooms, to treat injuries of varying levels of severity.

Over the past decade, there has been great interest in machine operator flesh-sensing, in order to quickly stop a table saw blade if the operator accidentally contacts the spinning blade. Until now, progress in the art has been largely due to the many inter-related patents of GASS, et al., such as U.S. Pat. No. 6,994,004, which have disclosed a method of destructively stopping a saw blade after direct contact between an operator and the saw blade. Although it is expected that the GASS et al. method, of capacitively sensing direct contact between an operator's flesh and a moving blade, will reduce the severity of injury to an operator, it will still likely result in some finite level of injury to the operator. U.S. Pat. No. 7,290,474, issued to KELLER, also discloses destructively stopping a saw blade, through the use of an explosive device. All of the presently available systems, for rapidly disabling a machine tool in case of emergency, have disadvantages of excessive cost, lack of convenience and/or lack of adaptability to previously-manufactured machine tools. Unfortunately, perhaps due to the aforementioned disadvantages, over the past decade, safety systems have not been widely implemented, and the accident statistics related to table saw injuries have shown no discernable improvement.

SUMMARY OF THE INVENTION

It would be desirable to have a system that uses flesh-sensing to improve operator safety on certain classes of machine tools, including table saws, by reacting prior to the start of an actual injury, and quickly enough to prevent the injury from happening or to mitigate injury to the operator. Furthermore, it would also be desirable to have a flesh-sensing safety system that may be used in conjunction with many previously-manufactured machine tools, requiring no modification and only a minor in-the-field electrical addition to the machine tool. Still further, it would be desirable to have an auxiliary flesh-sensing safety system that may be used to selectively control multiple machine tools. Therefore, currently there exists an urgent need in the industry for a system to bring flesh-sensing technology to various classes of machine tools including both existing machine tools as well as newly designed machine tools.

Accordingly, the present invention is a safety system for electric-motor powered machine tools and is intended to be used with existing machine tools, as well as for incorporation into new machine tool designs. The basic embodiment of this invention comprises an electrical operator control station, as well as a number of distinct and appropriate devices, adapted to interface with a respective type of machine tool, and incorporating a flesh-sensor which is electrically connected to the operator control station for precisely measuring operator contact or proximity to a dangerous portion of a machine tool. In addition, the present invention includes electric power control circuitry for rapidly braking a machine tool motor or initiating a machine-disabling electronic response as a result of flesh-detection.

The present invention addresses a novel amalgam of machine operator safety control and shielding devices including electronic flesh-detection, triggered in advance of an injury in order to electronically react in time to prevent or mitigate machine operator injury. While previous table saw machine tool flesh-sensing and electronic emergency response methods have been proposed, such as those of NIEBERLE-HAUER DE-19509771-A and DILS Published Application US-2004/0194594-A1, both have significant technical shortcomings. Both have been abandoned and neither has been shown to be commercially viable. The HAUER disclosure's proposed flesh-detection method is likely subject to electrostatic and electromagnetic noise in a machine tool environment and is complex and would be expensive to implement. The DILS abandoned patent application is unworkable due to various technical and electrical errors, including errors in the proposed method of rapidly stopping a machine motor. The NIEBERLE-HAUER patent disclosure proposed a proximity sensing method which is based upon the much earlier THEREMIN circuit disclosed in U.S. Pat. No. 1,661,058 of Feb. 28, 1928, entitled: Method of and Apparatus for the Generation of Sounds. Almost 90 years of no known commercial use, of the THEREMIN entertainment circuit method for human proximity detection, leads to the inescapable conclusion that the early device is impractical for such usage. The NIEBERLE-HAUER application, now abandoned, fails to teach or suggest how to successfully implement a THEREMIN circuit in the electrically noisy environment of an electric-motor-driven table saw. That disclosure is therefore non-enabling as a teaching of reliable capacitive flesh-sensing. A reliable capacitive detector must prevent electrical noise from causing false-positive triggering of emergency stopping measures.

Figure 3:
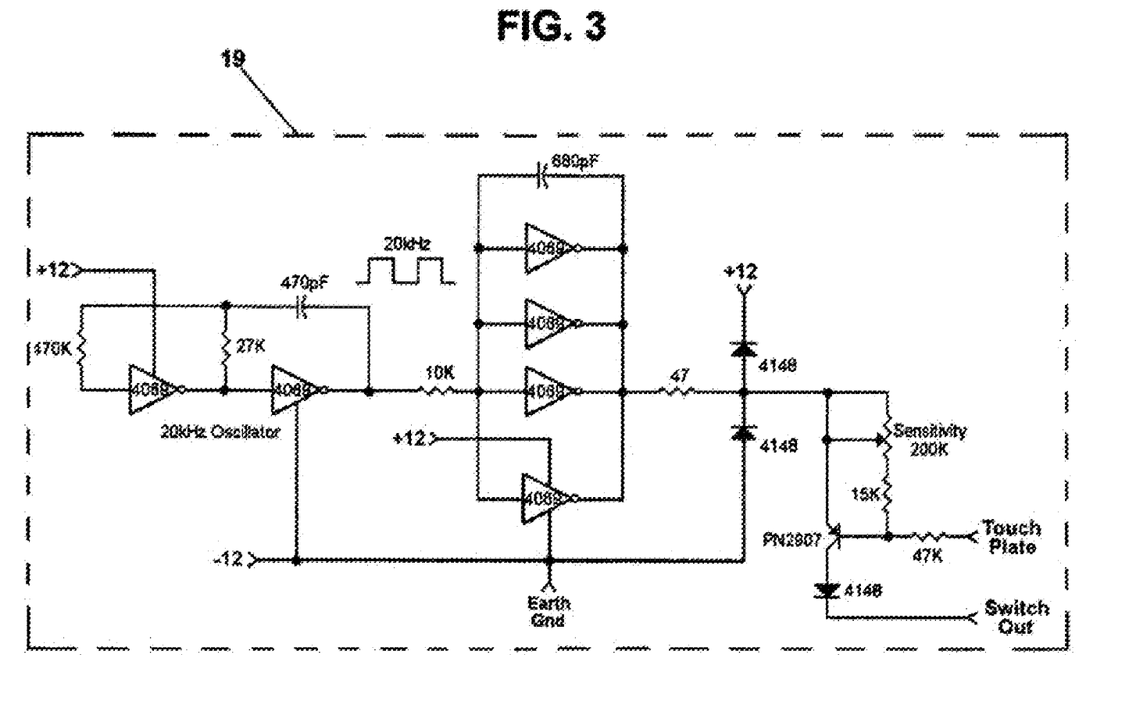
FIG. 3 is a electrical schematic diagram of an exemplary capacitive touch sensing circuit.

The flesh-sensing method employed herein is a capacitive touch flesh-sensing method, which is based upon well-known and very reliable prior art, dating back at least fifty years, such as U.S. Pat. No. 2,704,339, WESCOTT & GEIGER, granted 1955. There are many embodiments of capacitive flesh sensing circuit designs readily available, since the basic electronic principles are well understood and widely published. A large number of capacitive touch-sensing circuit variations are currently available and FIG. 3 is merely one basic example of a capacitive touch-sensing circuit. More recent resistive, infrared or surface-acoustic-wave (S-A-W) methods of flesh sensing are also within the scope of the present invention.

The present invention includes one or more of the following components: auxiliary machine operating controls, as well as electrical function and condition indicators, which are intended to enhance the safe operation of a machine tool by alerting both the machine operator and nearby observers of the present safety condition of the machine a locking mechanism to prevent use of the machine tool without employing the safety system features controls for arming or disarming the flesh-sensing circuit's electrical function and condition indicators appropriate to a particular class of machine tool operating power control circuits and emergency machine tool braking circuits.

There are many embodiments of capacitive flesh sensing circuit designs readily available, since the basic electronic principles are well understood and widely published.

BRIEF FIGURE DESCRIPTION

Preferred embodiments of the invention are illustrated in the drawings, of which.

DETAILED DESCRIPTION OF THE INVENTION

Figure 1:
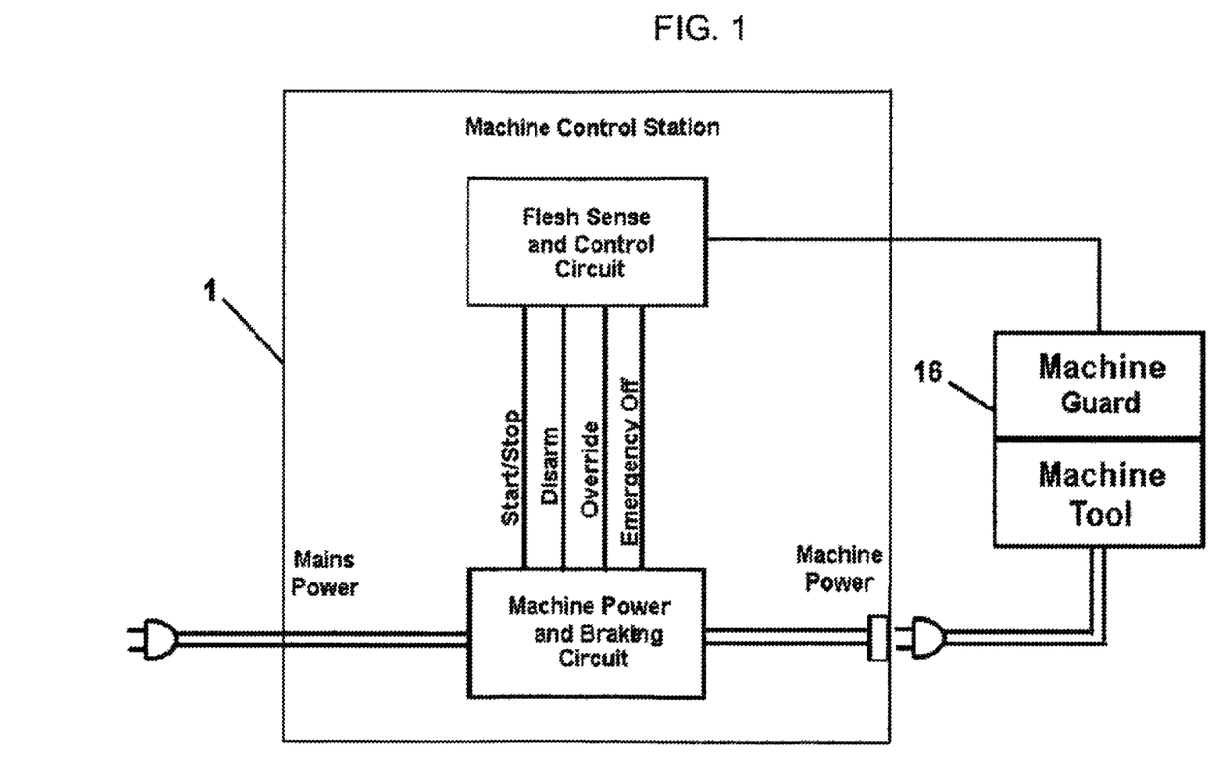
FIG. 1 is a basic system block diagram of the invention.
Figure 2:
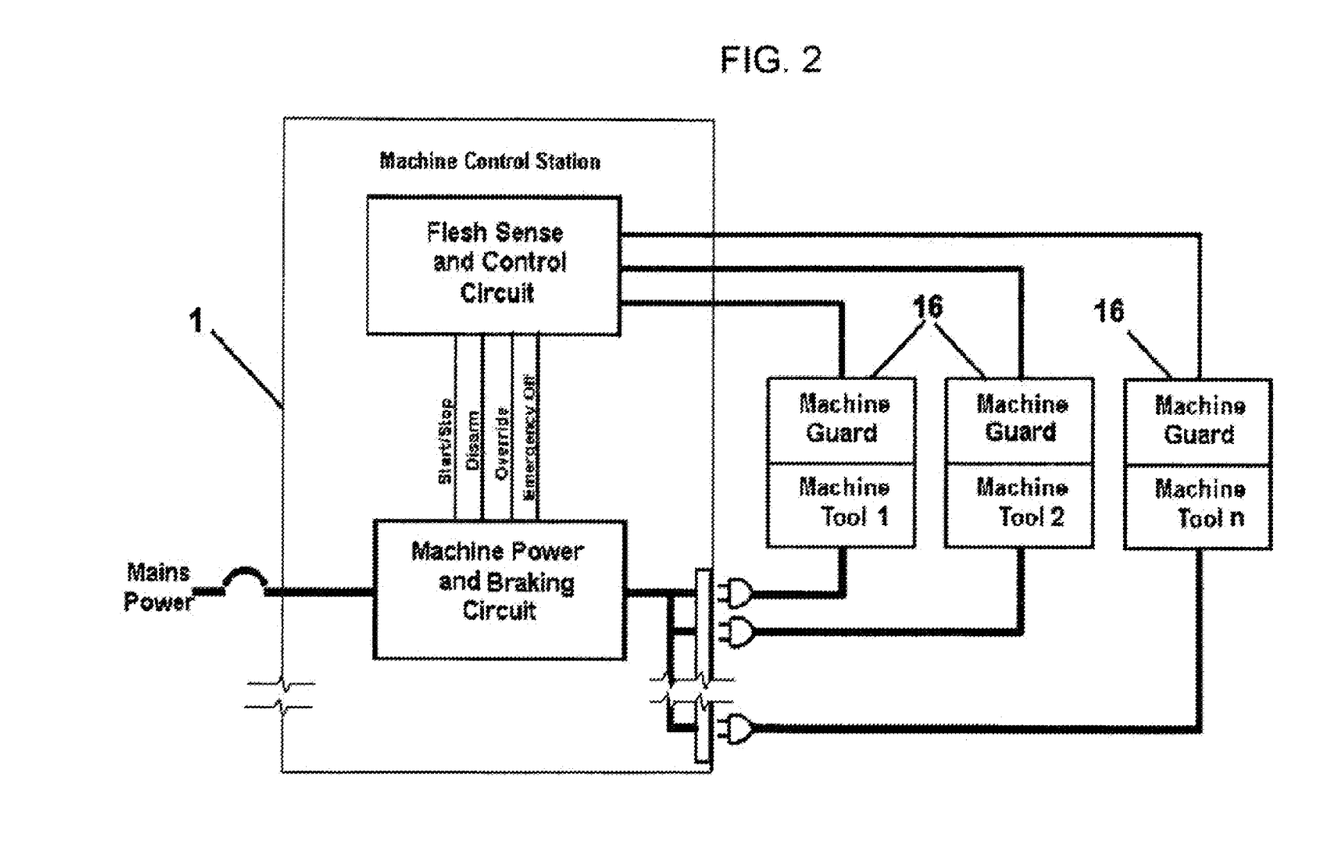
FIG. 2 is a basic system block diagram of a multi-port embodiment of the invention.

The basic embodiment of the invention is block-diagramed in FIG. 1 as a single machine tool safety system or in FIG. 2 as a multi-port machine tool safety system. The system of the present invention is made up of the following two main components: an electrical control safety station 1 suitable for use with electric-motor powered machine tools and a flesh-sensing machine guard 16 suitable for sensing presence of the operator's hands or body within close proximity to a dangerous portion of a machine tool, the machine guard being electrically connected to the control station. These components work together to create an architecture for the system that offers control, machine status indicators and flesh-sensing emergency braking or an alternative reaction which improves machine tool safety. It should further be noted that this invention embodiment may be electrically modified, according to the requirements of various classes of machine tools, with respect to parameters such as electric motor size, type, power rating, motor braking requirements and design. The geometry, transparency and size of the safety guard(s) can also be modified in a manner appropriate to the particular machine tool, on which the guard(s) will be installed.

Figure 11:
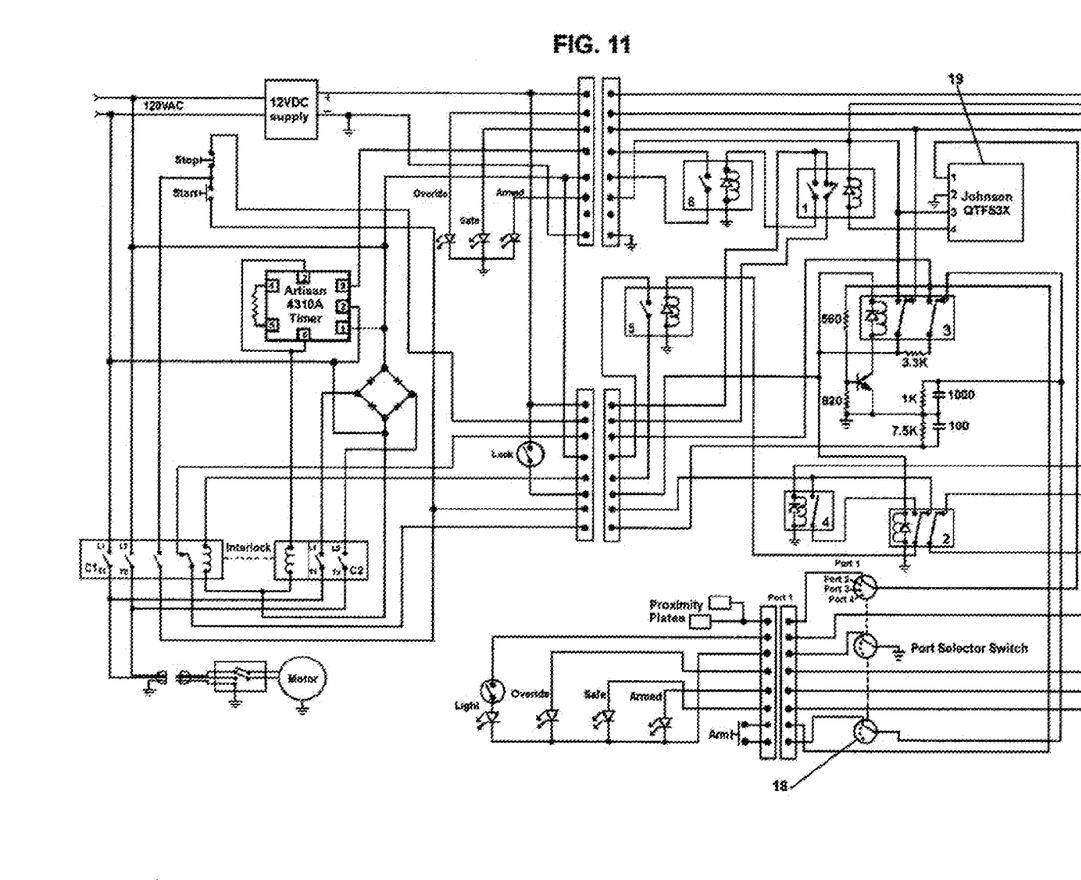
FIG. 11 is an exemplary electrical schematic diagram of a multi-port embodiment of the invention for use with machine tools employing single-phase induction motors.

FIGS. 2 and 11 show schematically a multi-port (4-port) implementation of the invention, for selectively controlling more than one machine tool.

Figure 5:
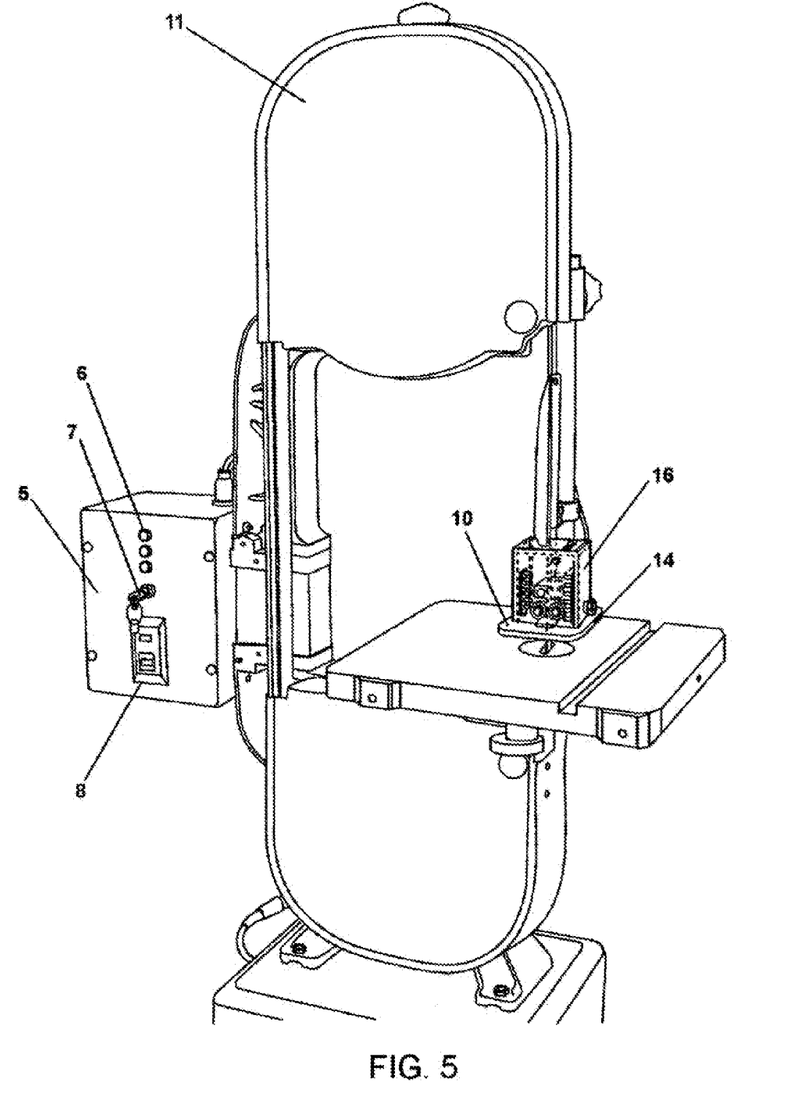
FIG. 5 is a perspective view of the safety system of the invention, installed on a band saw.
Figure 6:
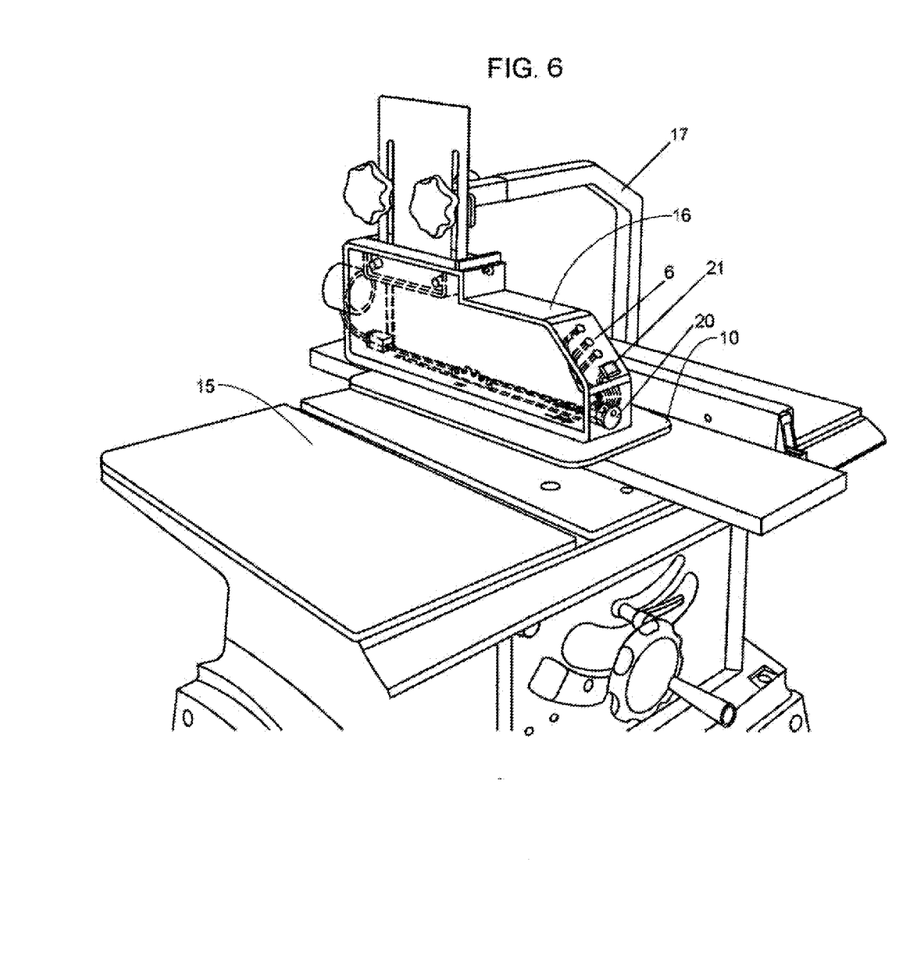
FIG. 6 is a perspective view of an exemplary machine guard installed on a bench-top style table saw, wherein the flesh-sensing and control circuitry are built into a base portion of the saw.
Figure 7:
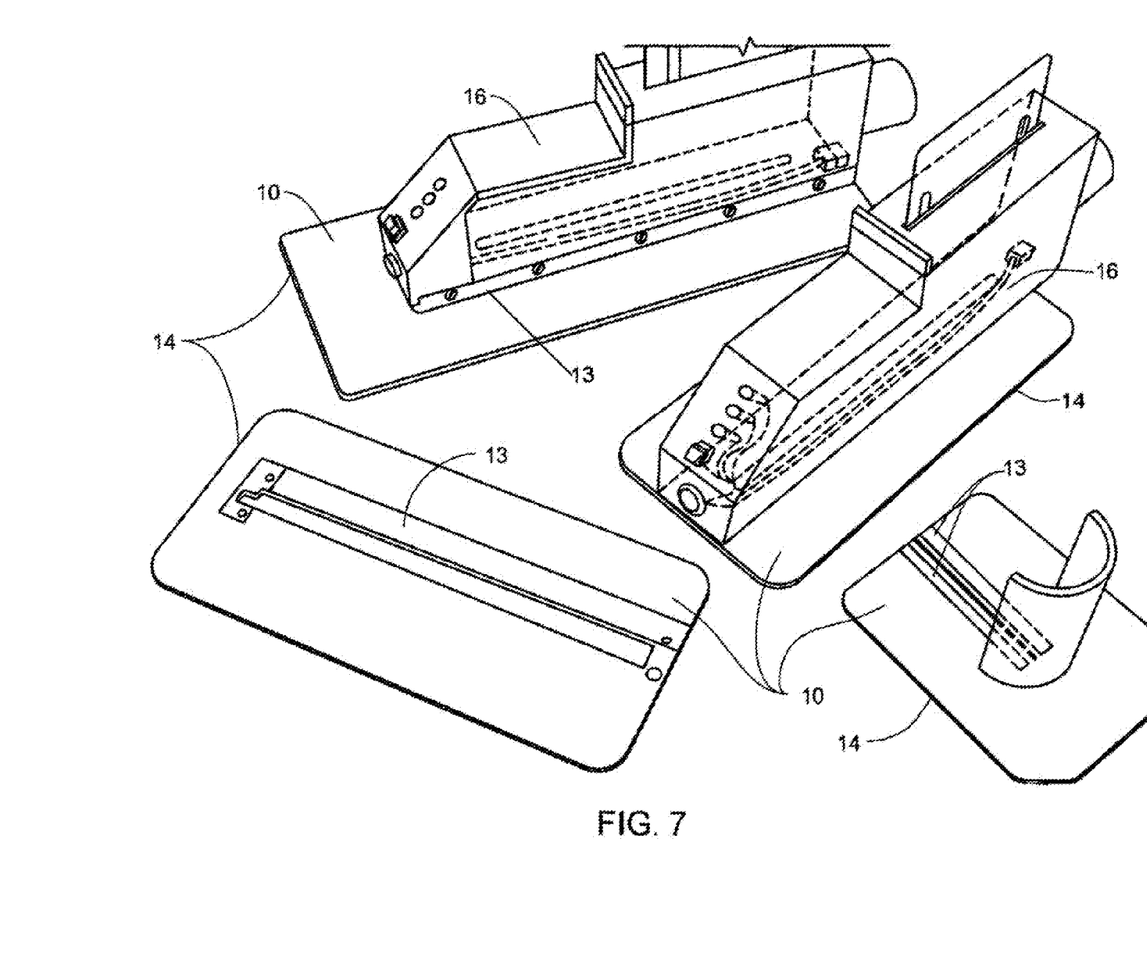
FIG. 7 is a perspective view of exemplary machine tool guards and safety shields encompassed by this invention.
Figure 8:
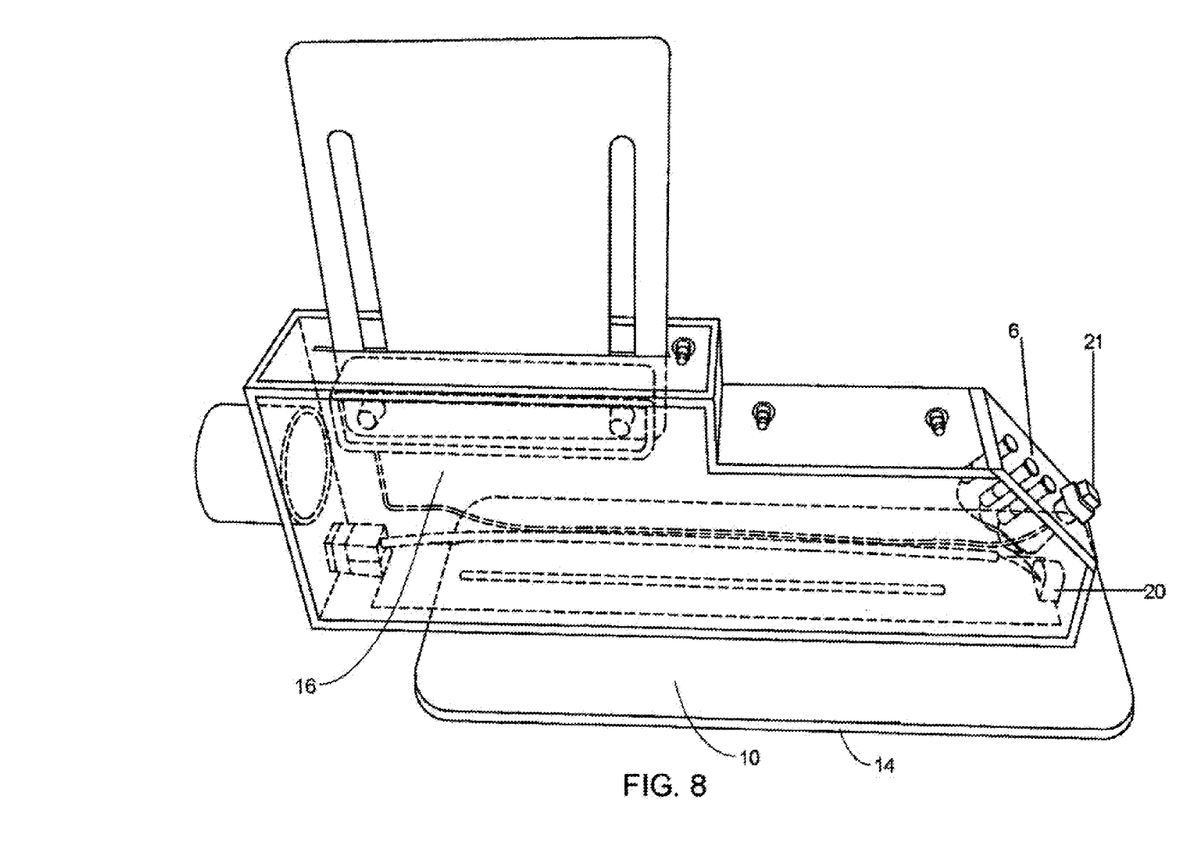
FIG. 8 is a perspective view of an exemplary machine guard for use with a table saw.
Figure 9:
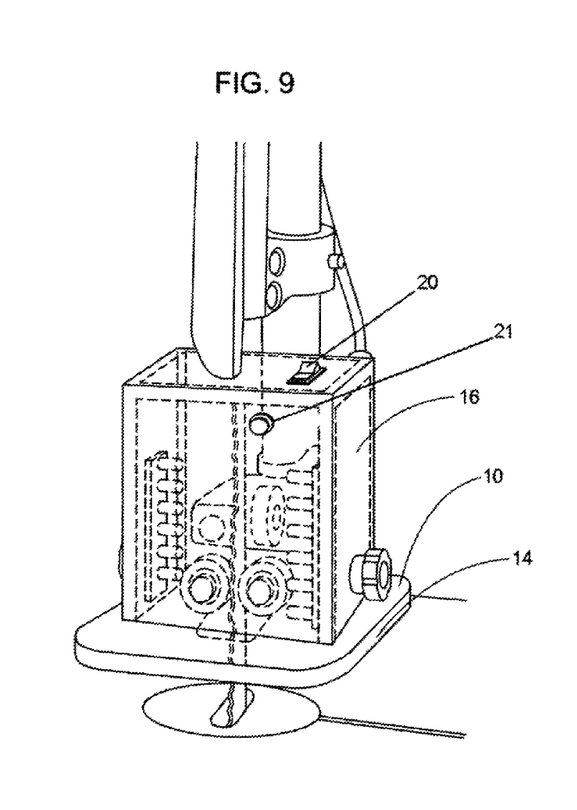
FIG. 9 is a perspective view of an exemplary machine guard for use with a band saw.

FIGS. 1, 2, 4-9, illustrate one or more solid transparent machine tool guards, to prevent contact between an operator's hand or other body part and a dangerous machinery component such as a saw blade. In addition to the basic exemplary machine guard shown in FIGS. 1, 2, 4-9, an auxiliary transparent peripheral safety shield 10, shown in FIGS. 4-9, may also be coupled to the machine guard, to further aid in preventing operator contact with a dangerous machine part. At least one of the machine guard 16 and the auxiliary safety shield 10 incorporates capacitive flesh-sensors in the present embodiment, for detecting operator contact or proximity. The capacitive flesh-sensors 14 are typically located along the vertical surfaces of the machine guard or the auxiliary safety shield 10, as shown in FIGS. 7-9.

Both the machine guard and auxiliary shield's shape, size and geometry are determined by the combination of the intended machine's overall design, as well as the distance from the machine danger zone at which the operator's contact is intended to deactivate or emergency-stop the machine tool, by first sensing the operator's flesh and, in response thereto, generating an electronic signal to rapidly initiate appropriate action to prevent injury to the machine operator. In the present embodiment, the electrical circuitry depicted schematically in FIG. 3 is employed to activate and sense the capacitive change to the flesh-sensors 14 when the operator is very close to contacting, or is touching, the flesh-sensors. According to a preferred embodiment of the FIG. 3 circuit, namely model QTFS3X, commercially available from professional engineer (and patentee) David A. Johnson of Lubbock, Tex. USA, a 20 kHz oscillator provides a capacitance value sample rate of about every 50 milliseconds. A higher oscillator frequency could alternately be used, for faster touch response, if desired. Numerous variations are possible and will be apparent to those having ordinary skill in the capacitance sensing art. A suitable threshold value for triggering is a delta (capacitance change) of 10 picofarads. An output signal from the detection circuit 19 can then actuate a control circuit which generates appropriate control signals to perform the emergency electromagnetic braking of the motor driving the saw blade. In this manner, detection occurs the instant that the operator touches the sensor, before contact is made with the blade, and thus before the operator can be injured by the blade or other dangerous tool part.

The embodiment depicted in FIG. 3 has been demonstrated to have sufficient electrical noise immunity to avoid false positive triggering (triggering when no body part is actually present), while being capable of detecting and responding to a capacitance change (caused by a touch of the saw operator) as low as 10 picofarads at the flesh-sensing conductor 14. Setting the threshold value lower than 10 picofarads would increase the sensitivity of the detector, at the risk of causing false-positive events, while setting the threshold value too high would reduce the sensitivity of the device, at the risk of causing false-negative events, i.e. instances when the emergency stop should be triggered but is not triggered. Generally planar element 10, shown in perspective view in FIGS. 4-9, is an exemplary machine safety shield 10, being used on a sawing machine, together with a blade safety guard 16. The sensitivity is adjusted using a variable resistor connected to the emitter and base terminals of a PNP switching transistor, preferably a Philips model 2907 as shown in FIG. 3.

An important feature, noted here, of the safety guard 16 intended for table saws, is that the elevation of the guard is specifically intended to be adjusted, to just above the work piece, and firmly secured in position, in order to prevent the dangerous table saw phenomenon known as kick-back which is believed to be the cause of most table saw related injuries. Kick-back refers to a common but dangerous phenomenon in which the wooden workpiece is lifted off the sawing table by the saw blade, and ejected, contrary to the direction of feed, back toward the operator at a high velocity.

The machine guard and safety shield may be made of any suitable solid transparent material, which will permit the machine operator to observe the workpiece. Sectors of the machine guard or safety shield surfaces are to be made electrically conductive, in order to serve as part of touch- or proximity-activated electronic sensors serving to detect operator body contact or proximity with the conductive portion of the safety shield. The conductive segments of the machine safety guard may or may not also be transparent to the operator. Suitable materials for conductive transparent electrodes are indium tin oxide (ITO) or other transparent film coatings (TFC) such as carbon nano-tubes (CNT). Such coatings can be applied to various suitable transparent substrates such as polycarbonate.

In the exemplary embodiment presented herein, all or a portion of the periphery of the machine guard and safety shield embodiments, shown as 14 in FIGS. 4-9, are electrically conductive and will enable an associated electronic circuit (such as the aforementioned Johnson QTFS3X) to detect operator contact with the edges of the generally-planar exemplary safety guard. As shown as FIG. 7, additional sectors 13 of the shield 10 or the guard 16 may also be conductive, so as to facilitate electrical connection between the periphery of the guard 16 and external electronic circuits.

FIGS. 5 and 9 depict an embodiment of the machine guard 16 and safety shield 10 to be employed on a band saw and in addition, FIG. 7 depicts examples of other suitable variations in size and shapes of machine guards 16 and safety shields 10. It should be understood that other machine guard and safety shield modifications, substitutions and alternatives will be apparent to a person having ordinary skill in the machine safety art. Such modifications, substitutions and alterations can be made without departing from the spirit and scope of the invention, which should be determined from the appended claims.

Figure 4:
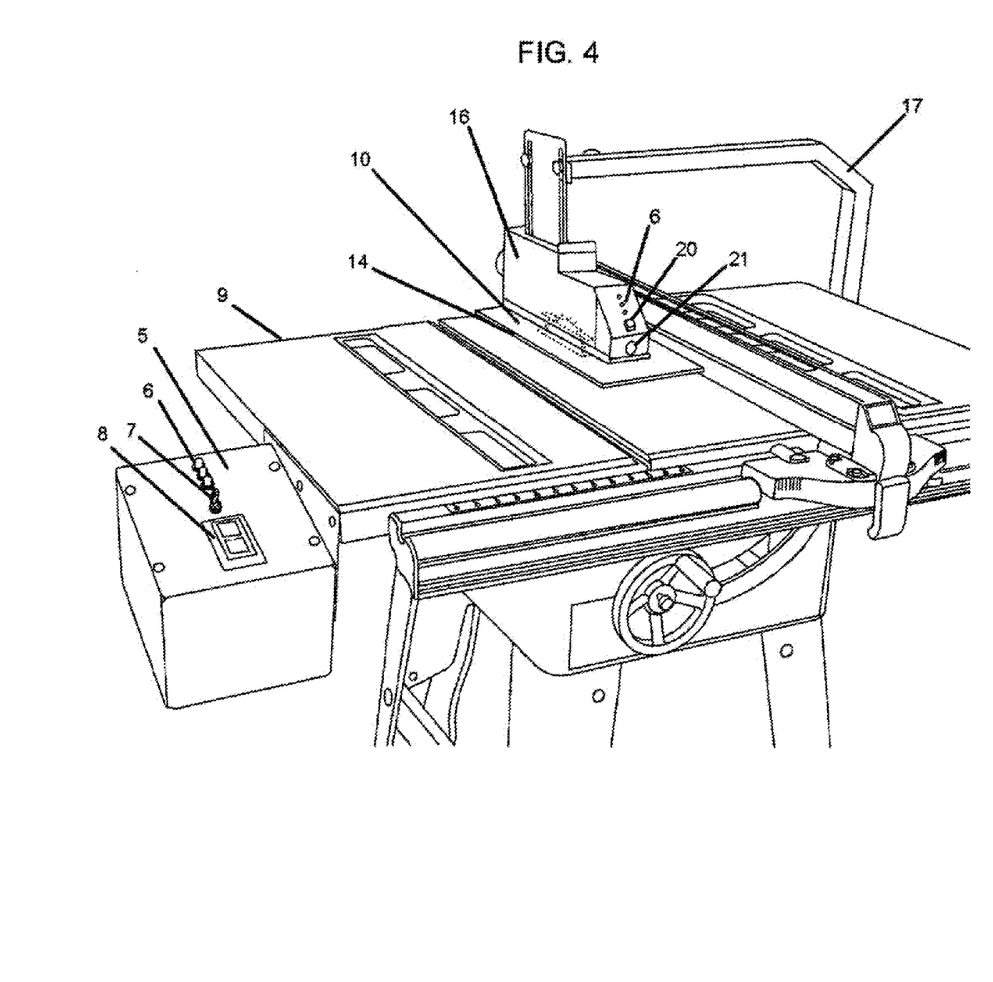
FIG. 4 is a perspective view of the safety system of the invention, installed on a table saw.

FIGS. 4-5 depict an exemplary auxiliary or external machine control station enclosure 5, a machine guard 16, a machine guard support 17 (FIGS. 4 and 6) and a safety shield 10 with a flesh-sensing conductive surface 14, all mounted on a table saw 9. The machine control station enclosure 5 typically contains the circuitry diagramed in FIGS. 1, 2, 10-12, including lighted indicators 6, a locking key 7, and a start-stop switch 8 as shown in FIGS. 4-5 and any other controls and circuit components which may be useful to the machine operator.

FIGS. 4-5 depict a similar exemplary machine control station enclosure 5, machine guard 16 shown in FIGS. 1, 2, 4-8, and safety shield 10, attached to a band saw 11 (FIG. 5). The functionalities, of the control stations depicted in FIGS. 4 and 5, are essentially identical, in that they are intended to emergency-stop the machine's induction motor upon detection of operator proximity to, or direct contact with, the flesh-sensing surface 14 of either the machine guard 16 or the safety shield 10.

Figure 10:
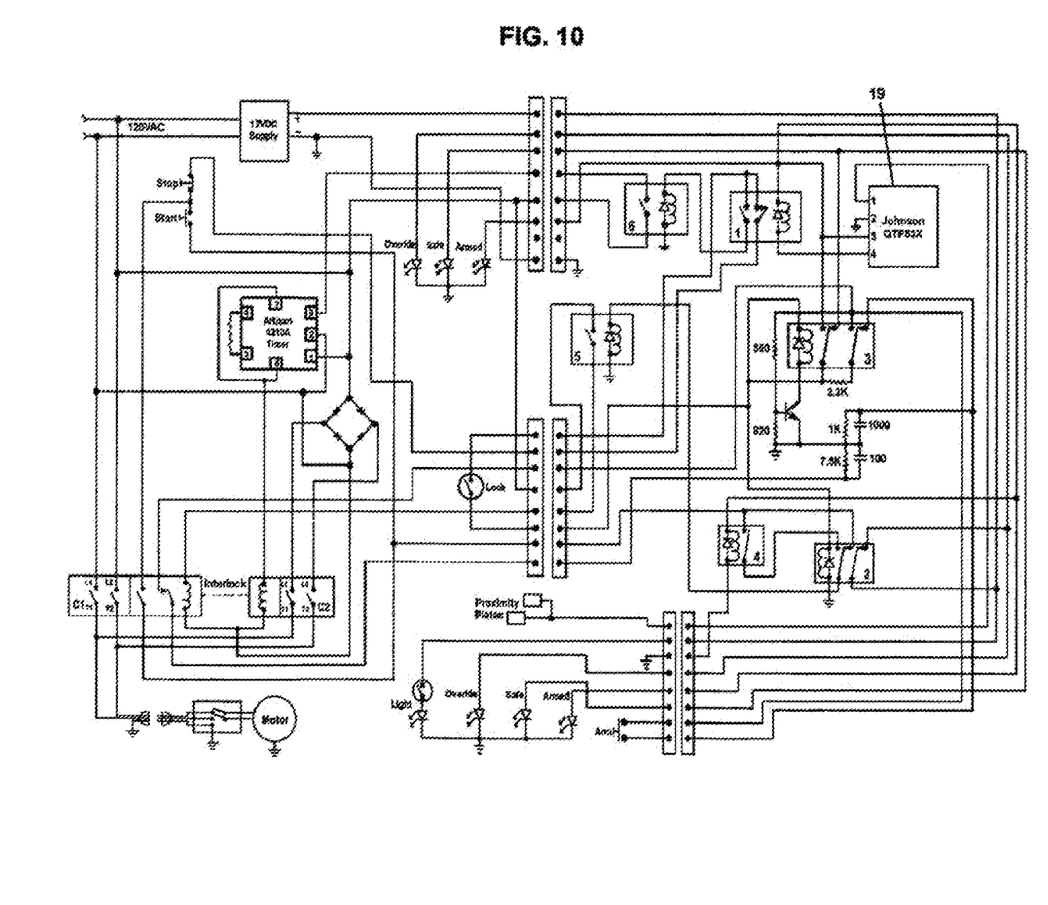
FIG. 10 is an exemplary electrical schematic diagram of a single-port embodiment of the invention for use with machine tools employing a single-phase induction motor.
Figure 12:
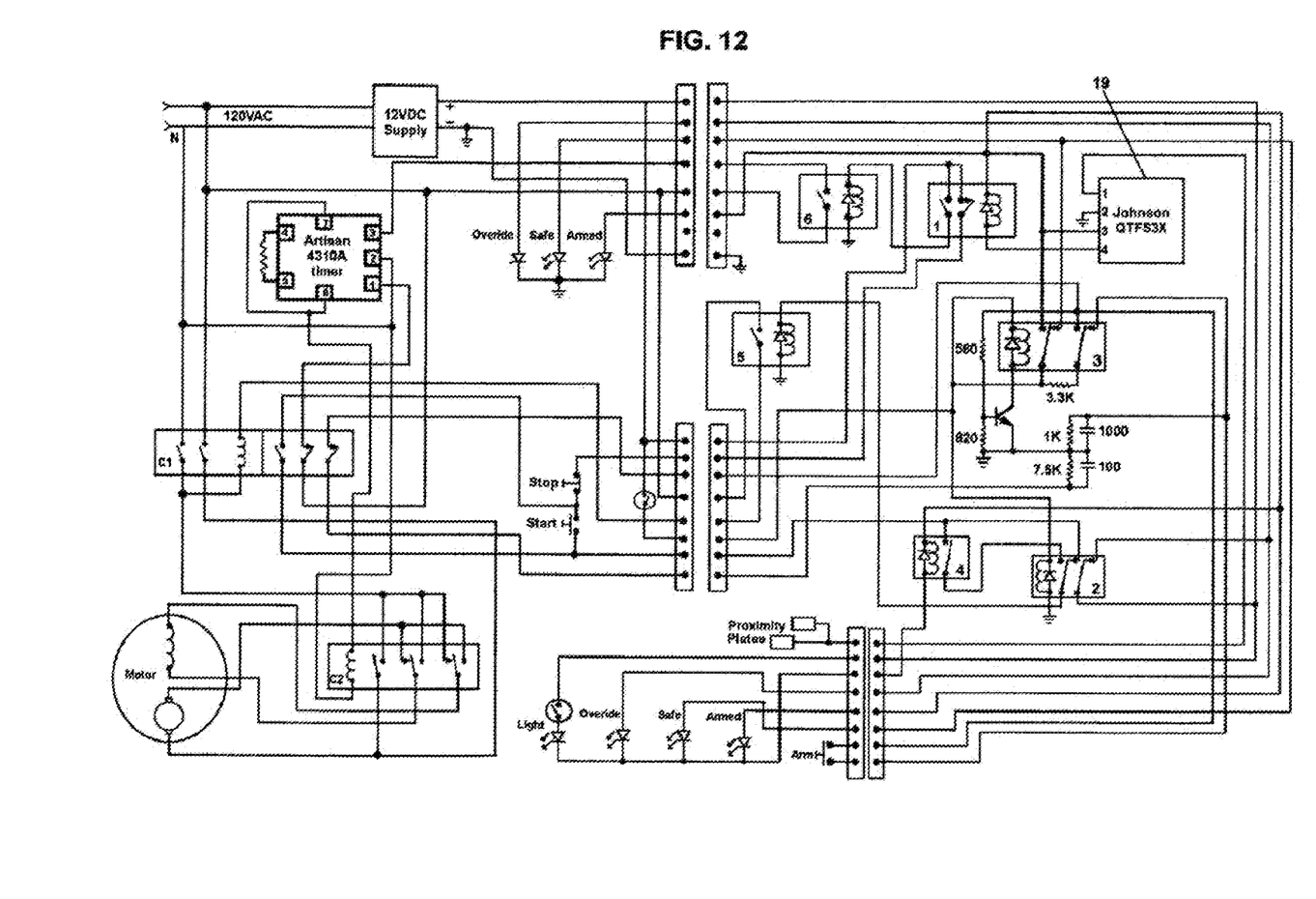
FIG. 12 is an exemplary electrical schematic diagram of a single-port embodiment of the invention, for use with machine tools employing series-wound universal motors.

FIG. 6 is a perspective view of exemplary machine tool guards and safety shields which are encompassed by this invention. Element 13, shown in FIG. 7, is a typical conductive electrical sector of a safety shield, used to connect the conductive surfaces 14 to the external electrical sensing circuit 19 as shown in FIGS. 10, 11, and 12.

FIG. 6 is an exemplary perspective view of safety system of this invention as factory-installed on a bench-top style table saw 15. The machine guard 16, safety shield 10 and machine guard support 17 are shown here, while the control station electronics are factory-installed within the table saw base and therefore not visible in the drawing.

FIG. 8 is a perspective close-up view of an exemplary blade guard 16 and safety shield 10 for a table saw.

FIG. 9 is a perspective close-up view of an exemplary blade guard 16 and safety shield 10 for a band saw which also includes a blade light and switch 20 and a brake arming push-button switch 21.

FIG. 10 is an exemplary electrical schematic diagram of the invention, intended for use with a single machine tool which employs a single-phase induction motor where the exemplary emergency-braking method employed is DC injection, also referred to as "dynamic braking." Both the mechanical relays and contactors shown in the drawings (of a prototype) could be replaced with solid-state devices, in order to Improve the circuit characteristics and to reduce volume production cost. FIG. 10 shows two Contactors, C1 and C2. For normal motor running, contactor C1 is closed to apply AC line power to the motor windings. For emergency stopping, contactor C2 is closed, to apply rectified 120 volts. As shown in FIG. 10, these contactors C1 and C2 are controlled by a START/STOP six-relay interlock chain, to control starting and stopping the saw motor. In addition, there is a capacitive touch switch module, Johnson QTFS3X, a 12 volt DC power supply, and control switches and LED indicators. The circuitry to the left of the lower cable connector is contained within the blade enclosure for an exemplary machine tool and all the remaining circuitry is contained within the control unit. C1 is the contactor supplying 120 VAC to the machine motor. C2 will supply a short burst of the rectified 120 VAC to an induction machine motor, to act as an emergency brake. This short burst of DC power is typically 200 milliseconds in duration, as specified by the ARTISAN® 4310A timer shown or by a similar circuit.

Emergency machine stopping is initiated whenever (A) the brake circuit is armed by the operator, and (B) the operator subsequently contacts the proximity plates shown in FIG. 10 or sensors 14 shown in other figures. Touching the sensor will trigger the Johnson QTFS3X capacitive touch circuit, or a similar circuit, to activate a Relay 1, shown at top right. The proximity switch module is connected to metal foil sensors 14 along the bottom edges of the saw blade enclosure. Should the operator touch, or come very close to, these sensors, the circuit will sense an increase in capacitance and activate R1, which will initiate braking. R1 NC (Normally Closed) is in the 12-volt DC motor start series chain, along with the Start-Stop switches, S1, C2 and relays R3 and R4, as shown in FIGS. 10-12. A third relay R3, together with the R-C components and transistor, acts as a bi-stable circuit or flip-flop, controlled by the toggle Brake Arm-Disarm switch, as well as the C1 NC auxiliary contacts closure signal when the motor power is removed. This circuit arrangement requires the operator to always arm the braking circuit, before each successive Start, and will always automatically disarm the brake when the saw is manually or automatically stopped and C1 is de-energized. Contactors C1 and C2 are mechanically interlocked, to insure they cannot be activated simultaneously. Alternatively, braking could be accomplished by using a variable frequency drive, such as the model D700 available from Mitsubishi Electric Company.

FIG. 11 is an exemplary electrical schematic diagram of the invention as a multi-port control station, intended for use with up to four machine tools employing respective single-phase induction motors. This embodiment employs a port selector switch 18, shown on the lower right of the diagram. Both embodiments show contactors C1, C2 at lower left.

FIG. 12 is an exemplary electrical schematic diagram of the invention, intended for use with a single machine tool which employs a single-phase series-wound universal motor where the exemplary emergency motor braking method employed is counter-current produced by reversing current flow through either the stator winding or the rotor winding, while short-circuiting the disconnected power line. In FIG. 12, elements comparable to those used in FIG. 10 and FIG. 11 bear similar designations. This method of motor braking, also referred to as plugging, is applicable to many tools that are driven by universal motors, such as the table saw depicted in FIG. 6. For emergency braking, after power supply to the motor is removed by opening contactor C1, contactor C2 is engaged for a brief period of time, whose duration is specified by a digital timer, preferably an ARTISAN® model 4310A timer as shown. The C2 contacts reverse the direction of current flow in the stator winding of the motor, and short the motor power leads to complete the circuit, causing a high current flow, as the rotor and stator fields magnetically oppose one another, until the motor comes to a stop. After the rotor comes to a stop, the C2 contacts open, so that the circuit and motor return to a configuration which permits normal motor operation.

If electro-mechanical braking is desired, instead of electromagnetic braking, the flesh-sensing circuit could be configured to trigger operation of a conventional brake motor, such as those commercially available from Baldor Electric Company of Fort Smith, Ark., USA (member of the ABB Group) or KEBCO Power Transmission of St. Paul, Minn., USA.

Various changes and modifications are possible, within the scope of the inventive concept, as will be apparent to persons having ordinary skill in the machine tool safety art.

What is claimed is:

1. A machine tool safety system adapted for electrical connection to an electric-motor-driven machine tool, comprising:
   a substantially transparent safety guard (16), shaped to surround at least one dangerous part of a machine tool, and fixed in place to prevent a portion of a human operator's body from contacting said dangerous part;
   at least one electrical element (14), forming part of said safety guard, and coupled to
   an electronic flesh-sensing response circuit (19) which detects any capacitance change of at least 10 picofarads resulting when an operator contacts said electrical element (14), and generates a corresponding output signal;
   an electrical control circuit connected to the flesh-sensing circuit (19) in such a way as to sense bodily contact; and
   an electrical control circuit which, upon receiving said output signal from the flesh-sensing circuit (19), generates a current burst, on a winding of a motor of said electric-motor-driven machine tool, having a duration of at least 200 milliseconds to brake motion of a rotor of said motor, to a negligible speed, quickly enough to avoid injury to a body part of said operator.

2. The machine tool safety system of claim 1, wherein said flesh-sensing circuit senses the machine operator's flesh by detecting a change in capacitance when an operator touches said electrical element (14).

3. The machine tool safety system of claim 1, wherein said flesh-sensing circuit (19) senses the operator's flesh by detecting infra-red radiation from said flesh.

4. The machine tool safety system of claim 1, wherein said flesh-sensing circuit (19) senses the machine operator's flesh by detecting obstruction of a surface acoustic wave by said flesh.

5. The machine tool safety system of claim 1, further comprising an elongated, electrically conductive layer (13), applied to a surface of said safety guard (16), and electrically coupled to said flesh-sensing circuit, to thereby detect touch by an operator.

6. The machine tool safety system of claim 5, wherein said at least one electrical element (13) is a transparent electrically conductive layer extending along an outer surface of said guard (16).

7. The machine tool safety system of claim 6, wherein said electrically conductive layer comprises indium tin oxide.

8. The machine tool safety system of claim 6, wherein said electrically conductive layer comprises carbon nano-tubes.

9. The machine tool safety system of claim 1, wherein said electrical control circuit, upon receipt of a trigger signal from said flesh-sensing circuit (19),
   disconnects AC line power to the motor,
   injects DC power to the motor for sufficient time to brake, to a negligible speed, rotation of said motor of said machine tool.

10. The machine tool safety system of claim 1, wherein said electrical control circuit, upon receipt of a trigger signal from said flesh-sensing circuit (19),
    removes line power to a motor of said electric-motor-driven tool and
    reverses direction of current flow in a stator winding of said motor, while short circuiting disconnected motor power leads of said motor, in order to stop the motor.

11. The machine tool safety system of claim 1, wherein said electrical control circuit, upon receipt of a trigger signal from said flesh-sensing circuit (19),
    removes line power to the motor; and
    reverses direction of current flow in a rotor winding of said motor, while short circuiting the disconnected motor power leads, in order to stop the motor.

12. The machine tool safety system of claim 1 wherein the control circuit, upon receipt of a trigger signal from said flesh-sensing circuit, utilizes capacitor braking to rapidly stop the electric motor.

13. The machine tool safety system of claim 1 wherein the control circuit, upon receipt of a trigger signal from said flesh-sensing circuit, utilizes resistor braking to rapidly stop the electric motor.

14. The machine tool safety system of claim 1 wherein the control circuit, upon receipt of a trigger signal from said flesh-sensing circuit, utilizes a variable frequency drive circuit braking method to rapidly stop the electric motor.

15. The machine tool safety system of claim 1 wherein the control circuit, upon receipt of a trigger signal from said flesh-sensing circuit, utilizes electro-mechanical means to rapidly stop the electric motor.

16. The machine tool safety system of claim 1, wherein said flesh-sensing circuit (19) is a touch-responsive integrated circuit.

17. The machine tool safety system of claim 16, wherein said integrated circuit is a Johnson model QTFS3X circuit.

18. The machine tool safety system of claim 1, wherein said electrical control circuit includes a timer and a plurality of switches (C1, C2) coupled to at least one winding of said motor, in order to control direction and duration of current flowing therein.

* * * * *